United States Patent
Kimura et al.

(10) Patent No.: US 8,293,109 B2
(45) Date of Patent: Oct. 23, 2012

(54) WASTEWATER TREATMENT METHOD

(75) Inventors: Yuya Kimura, Tokyo (JP); Kazuichi Isaka, Tokyo (JP); Tatsuo Sumino, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 263 days.

(21) Appl. No.: 12/728,290

(22) Filed: Mar. 22, 2010

(65) Prior Publication Data

US 2010/0243562 A1    Sep. 30, 2010

(30) Foreign Application Priority Data

Mar. 25, 2009    (JP) .................................. 2009-074247

(51) Int. Cl.
C02F 3/28    (2006.01)
(52) U.S. Cl. .................. 210/605; 210/616; 210/903
(58) Field of Classification Search .................. 210/605, 210/615, 616, 617, 630, 903
See application file for complete search history.

(56) References Cited

U.S. PATENT DOCUMENTS

| | | | |
|---|---|---|---|
| 6,383,390 | B1 | 5/2002 | Van Loosdrecht et al. |
| 2006/0191846 | A1* | 8/2006 | Sumino et al. ................. 210/603 |
| 2011/0253625 | A1* | 10/2011 | Takeda ........................... 210/615 |

FOREIGN PATENT DOCUMENTS

| | | |
|---|---|---|
| JP | 2001-506535 | 5/2001 |
| JP | 2001-293494 | 10/2001 |
| JP | 2004-230225 | 8/2004 |
| JP | 2004-230259 | 8/2004 |

OTHER PUBLICATIONS

K. A. Third et al.; The CANON System (completely Autotrophic Nitrogen-removal Over Nitrite) under Ammonium Limitation: Interaction and Competition between Three Groups of Bacteria; System. Appl. Microbiol. 24, 588-596 (2001).
Kazuichi Isaka et al.; Growth characteristic of anaerobic ammonium-oxidizing bacteria in an anaerobic biological filtrated reactor; Appl Microbiol Biotechnol (2006) 70: 47-52.
Kazuichi Isaka et al.; Ammonium removal performance of anaerobic ammonium-oxidizing bacterial immobilized in polyethylene glycol gel carrier; Appl Microbiol Biotechnol (2007) 76:1457-1465.
Furukawa et al., Innovative Treatment System for Digester Liquor Using Anammox Process, Bioresource Technology, vol. 100, 2009, pp. 5437-5443.
Dutch Search Report and Written Opinion with translation dated Nov. 1, 2010, for Patent Application No. 2004439.

* cited by examiner

*Primary Examiner* — Fred Prince
(74) *Attorney, Agent, or Firm* — Antonelli, Terry, Stout & Kraus, LLP.

(57) ABSTRACT

A wastewater treatment method for treating wastewater containing ammonium nitrogen, includes the steps of: charging an unacclimated denitrification carrier containing anaerobic ammonium-oxidizing bacteria into a treatment tank; charging an unacclimated nitrification carrier containing nitrifying bacteria into the treatment tank; acclimating the unacclimated denitrification carrier in the treatment tank under an anaerobic condition; acclimating the unacclimated nitrification carrier in the treatment tank under an aerobic condition, after having acclimated the denitrification carrier; nitriting the ammonium nitrogen in the wastewater to generate nitrite with the acclimated nitrification carrier; and denitrifying the nitrite generated by nitriting the ammonium nitrogen with the acclimated denitrification carrier, while using the ammonium nitrogen in the wastewater as a hydrogen donor.

12 Claims, 3 Drawing Sheets

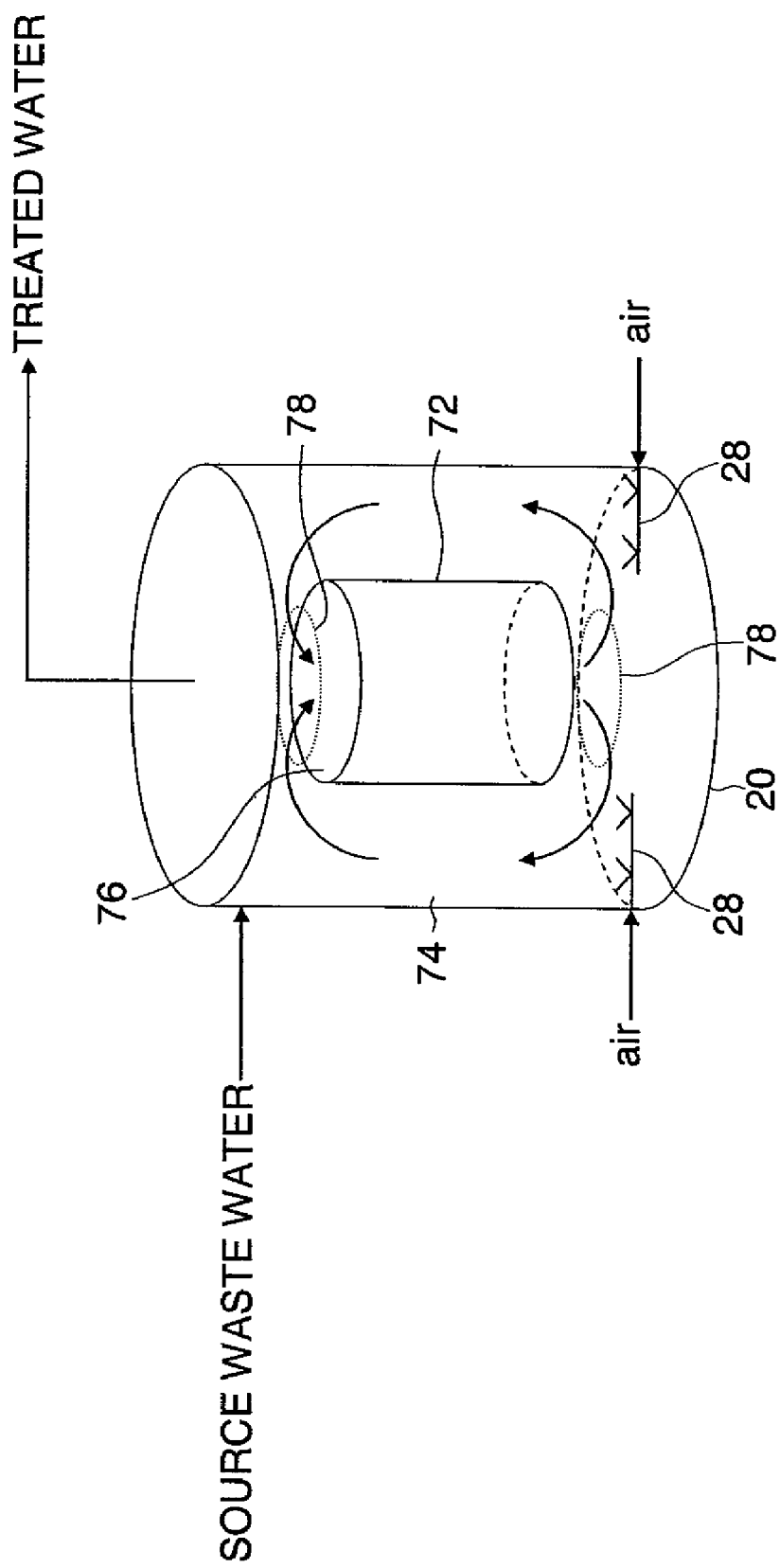

WASTEWATER TREATMENT METHOD

CROSS-REFERENCE TO RELATED APPLICATIONS

This application claims the priority benefit under 35 U.S.C. §119 of Japanese Patent Application No. 2009-074247 filed on Mar. 25, 2009, which is hereby incorporated in its entirety by reference.

BACKGROUND OF THE INVENTION

1. Field of the Invention

The presently disclosed subject matter relates to a wastewater treatment method, and particularly relates to a method for treating wastewater containing ammonium nitrogen and a treatment apparatus therefor.

2. Description of the Related Art

In recent years, a method including denitrification treatment with the use of anaerobic ammonium-oxidizing bacteria (anaerobic ammonium oxidation method) has drawn attention as a method for treating wastewater containing ammonium nitrogen. The method includes nitriting the ammonium nitrogen in the wastewater into nitrite with nitrifying bacteria in a nitrification tank, and then simultaneously denitrifying the nitrite and the ammonium nitrogen in the wastewater in a denitrification tank with the anaerobic ammonium-oxidizing bacteria. The method does not need the supply of an extraneous organic substance at the time of a denitrification reaction, and accordingly can efficiently perform wastewater treatment.

A simultaneous denitrification reaction in an anaerobic ammonium oxidation method proceeds according to a following reaction formula (1). Accordingly, in order to reliably decompose and remove the ammonium nitrogen in the wastewater, it is necessary to control the ratio of the ammonium nitrogen to the nitrite nitrogen in the denitrification tank based on the stoichiometric ratio in the following reaction formula (1). For this reason, the nitrification rate in the nitrification tank has been needed to be strictly controlled.

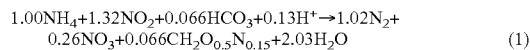

$$1.00NH_4 + 1.32NO_2 + 0.066HCO_3 + 0.13H^+ \rightarrow 1.02N_2 + 0.26NO_3 + 0.066CH_2O_{0.5}N_{0.15} + 2.03H_2O \quad (1)$$

Then, a method (so-called CANON method) is proposed which allows both of the nitrification reaction and the denitrification reaction to proceed in the treatment tank in which the nitrifying bacteria and the anaerobic ammonium-oxidizing bacteria coexist, under an aerobic condition (Third, K. A., Sliekers, A. O., Kuenen, J. G., Jetten, M. S. M., "The CANON system (completely autotrophic nitrogen-removal over nitrite) under ammonium limitation: interaction and competition between three groups of bacteria," Syst. Appl. Microbial. 24(4), 2001, pp. 588-596, for instance). This method can reliably decompose and remove the ammonium nitrogen in the wastewater even without strictly controlling the nitrification rate because the nitrifying bacteria and the anaerobic ammonium-oxidizing bacteria which coexist in the same treatment tank tend to keep balance with each other.

The CANON method needs to make the nitrifying bacteria and the anaerobic ammonium-oxidizing bacteria coexist in the same treatment tank. For this reason, a method is proposed which makes both of the nitrifying bacteria and the anaerobic ammonium-oxidizing bacteria coexist in the same biofilm, and treats the wastewater with the biofilm.

For instance, Japanese National Publication of International Patent Application No. 2001-506535 and Japanese Patent Application Laid-Open No. 2004-230225 describe a method of preparing a carrier (double-structure carrier) including a biofilm with a double structure which has the anaerobic ammonium-oxidizing bacteria entrapped and immobilized therein, and has the nitrifying bacteria attached on a surface of the biofilm, and treating wastewater with the use of the carrier.

In addition, Japanese Patent Application Laid-Open No. 2001-293494 describes a method of treating wastewater with the use of a carrier (sponge) in which both of the nitrifying bacteria and the anaerobic ammonium-oxidizing bacteria have been immobilized.

SUMMARY OF THE INVENTION

On the other hand, the inventors of the presently disclosed subject matter have made an investigation on a method for treating wastewater with the use of nitrifying bacteria and anaerobic ammonium-oxidizing bacteria which inhabit in separate biofilms, as a substitutable method for the methods described in Japanese National Publication of International Patent Application No. 2001-506535, Japanese Patent Application Laid-Open No. 2004-230225 and Japanese Patent Application Laid-Open No. 2001-293494. This method includes immobilizing the nitrifying bacteria and the anaerobic ammonium-oxidizing bacteria on different carriers from each other (nitrification carrier and denitrification carrier), and treating the wastewater with the use of these carriers.

The above described method can easily control the ratio of bacterial loads of the nitrifying bacteria to the anaerobic ammonium-oxidizing bacteria by adjusting a volume ratio of the nitrification carrier to the denitrification carrier. Accordingly, the method prevents any one of the nitrification reaction and the denitrification reaction from becoming a rate-limiting factor, and can rapidly perform the wastewater treatment.

However, while the nitrifying bacteria are aerobic bacteria which need dissolved oxygen for proliferation, the anaerobic ammonium-oxidizing bacteria are anaerobic bacteria of which the proliferation is limited by the presence of a certain amount or more of dissolved oxygen. Therefore, it is a challenge how to acclimate both of the bacteria.

In this point, Japanese National Publication of International Patent Application No. 2001-506535 and Japanese Patent Application Laid-Open No. 2004-230225 do not specifically describe the acclimation of the nitrifying bacteria and the anaerobic ammonium-oxidizing bacteria.

In addition, Japanese Patent Application Laid-Open No. 2001-293494 describes a method of accumulating the nitrifying bacteria in a sponge, and adding the anaerobic ammonium-oxidizing bacteria which have been acclimated in another tank, to the sponge. However, this method not only takes a time in adding the anaerobic ammonium-oxidizing bacteria which have been acclimated in another tank, to the sponge, but also needs a cost for providing the tank for acclimating the anaerobic ammonium-oxidizing bacteria.

The presently disclosed subject matter has been made in view of the above described circumstances, and an object thereof is to provide a wastewater treatment method which can easily acclimate nitrifying bacteria and anaerobic ammonium-oxidizing bacteria at a low cost, and can easily control the ratio of bacterial loads of both bacteria.

A wastewater treatment method according to the presently disclosed subject matter is a wastewater treatment method for treating wastewater containing ammonium nitrogen, including the steps of: charging (feeding) an unacclimated denitrification carrier containing anaerobic ammonium-oxidizing bacteria into a treatment tank; charging (feeding) an unacclimated nitrification carrier containing nitrifying bacteria into the treatment tank; acclimating the unacclimated denitrification carrier in the treatment tank under an anaerobic condition; acclimating the unacclimated nitrification carrier in the treatment tank under an aerobic condition, after having acclimated the denitrification carrier; nitriting the ammonium nitrogen in the wastewater to generate nitrite with the acclimated nitrification carrier; and denitrifying the nitrite generated by nitriting the ammonium nitrogen with the acclimated denitrification carrier, while using the ammonium nitrogen in the wastewater as a hydrogen donor.

It has been conventionally thought necessary to use a biofilm in which the nitrifying bacteria and the anaerobic ammonium-oxidizing bacteria coexist, when allowing a nitrification reaction and a denitrification reaction to proceed in the identical treatment tank. In such circumstances, the inventors of the presently disclosed subject matter have made an extensive investigation, and as a result, found that the nitrification reaction and the denitrification reaction can be allowed to proceed in the identical treatment tank, by immobilizing the nitrifying bacteria and the anaerobic ammonium-oxidizing bacteria in each separate carrier and making these two kinds of carriers mixed in the tank.

The above described wastewater treatment method is based on the above described knowledge, and the ratio of bacterial loads of the nitrifying bacteria to the anaerobic ammonium-oxidizing bacteria can be easily controlled, by immobilizing the nitrifying bacteria and the anaerobic ammonium-oxidizing bacteria in each different carrier from the other and by adjusting the volume ratio of the nitrification carrier to the denitrification carrier. Accordingly, the method prevents any one of the nitrification reaction and the denitrification reaction from becoming a rate-limiting factor, and can rapidly perform the wastewater treatment.

The method according to the presently disclosed subject matter also can acclimate the nitrification carrier without deactivating the anaerobic ammonium-oxidizing bacteria in the denitrification carrier, by acclimating the nitrification carrier under an aerobic condition after having acclimated the denitrification carrier under an anaerobic condition. This is because the acclimated anaerobic ammonium-oxidizing bacteria form a local anaerobic field in their surroundings by generating a large quantity of nitrogen gas through the denitrification reaction, and can maintain their activity even if the condition in the treatment tank is aerobic as a whole.

Furthermore, the method can simplify the acclimation step and reduce its cost, because of acclimating the nitrifying bacteria and the anaerobic ammonium-oxidizing bacteria in the identical tank (treatment tank).

In the wastewater treatment method, it is preferable to acclimate the denitrification carrier so that the number of the anaerobic ammonium-oxidizing bacteria is $1.5 \times 10^7$ cells/mL or more, and then to acclimate the nitrification carrier.

Thereby, the method can more reliably prevent anaerobic ammonium-oxidizing bacteria in a denitrification carrier from being deactivated when the nitrification carrier is acclimated.

In the wastewater treatment method, it is preferable to maintain the concentration of dissolved oxygen in the treatment tank at less than 1 mg/L in the step of acclimating the denitrification carrier.

By maintaining the concentration of dissolved oxygen in the treatment tank at less than 1 mg/L when acclimating the denitrification carrier, the denitrification carrier (anaerobic ammonium-oxidizing bacteria) can be efficiently acclimated.

In the wastewater treatment method, it is preferable to maintain the concentration of dissolved oxygen in the treatment tank at 1 mg/L or more and 8 mg/L or less, in the step of acclimating the nitrification carrier.

By maintaining the concentration of dissolved oxygen in the treatment tank in the above described range when acclimating the nitrification carrier, the nitrification carrier (nitrifying bacteria) can be efficiently acclimated without deactivating anaerobic ammonium-oxidizing bacteria in the denitrification carrier.

In the wastewater treatment method, it is preferable to supply a nitrite solution to the treatment tank in the step of acclimating the denitrification carrier.

By supplying nitrite necessary for acclimating the anaerobic ammonium-oxidizing bacteria to the treatment tank, the denitrification carrier (anaerobic ammonium-oxidizing bacteria) can be efficiently acclimated.

In the wastewater treatment method, it is preferable that the wastewater in the treatment tank is aerated and stirred intermittently with the use of an air diffuser, in the step of acclimating the denitrification carrier Thereby, the method makes the denitrification carrier in the treatment tank flow, prevents a liquid around the denitrification carrier (wastewater) from stagnating, and can efficiently acclimate the anaerobic ammonium-oxidizing bacteria.

In the wastewater treatment method, the denitrification carrier and the nitrification carrier are preferably entrapment immobilization pellets.

When the entrapment immobilization pellets are used as carriers, the exfoliation of a biofilm does not occur, which can occur in attachment immobilization pellets. Accordingly, the amount of bacteria in the entrapment immobilization pellets is reliably controlled. In addition, when the entrapment immobilization pellets are used, the return of sludge is unnecessary in the acclimation step, so the bacteria can be comparatively easily acclimated.

A wastewater treatment method according to the presently disclosed subject matter can rapidly perform wastewater treatment by immobilizing nitrifying bacteria and anaerobic ammonium-oxidizing bacteria in each different carrier (a nitrification carrier and a denitrification carrier, respectively) from the other, and by adjusting a volume ratio of the nitrification carrier to the denitrification carrier to prevent any one of the nitrification reaction and the denitrification reaction from becoming a rate-limiting factor.

The method also can acclimate the nitrification carrier without deactivating the anaerobic ammonium-oxidizing bacteria in the denitrification carrier, by acclimating the nitrification carrier after having acclimated the denitrification carrier under an anaerobic condition.

Furthermore, the method can simplify the acclimation step and reduce its cost, because of acclimating the nitrifying bacteria and the anaerobic ammonium-oxidizing bacteria in an identical tank (treatment tank).

BRIEF DESCRIPTION OF THE DRAWINGS

FIG. 3 is a block diagram illustrating a modified example of the treatment tank in the wastewater treatment apparatus illustrated in FIG. 2.

DETAILED DESCRIPTION OF THE PREFERRED EMBODIMENTS

The embodiments according to the presently disclosed subject matter will be described below with reference to the attached drawings.

Figure 1:
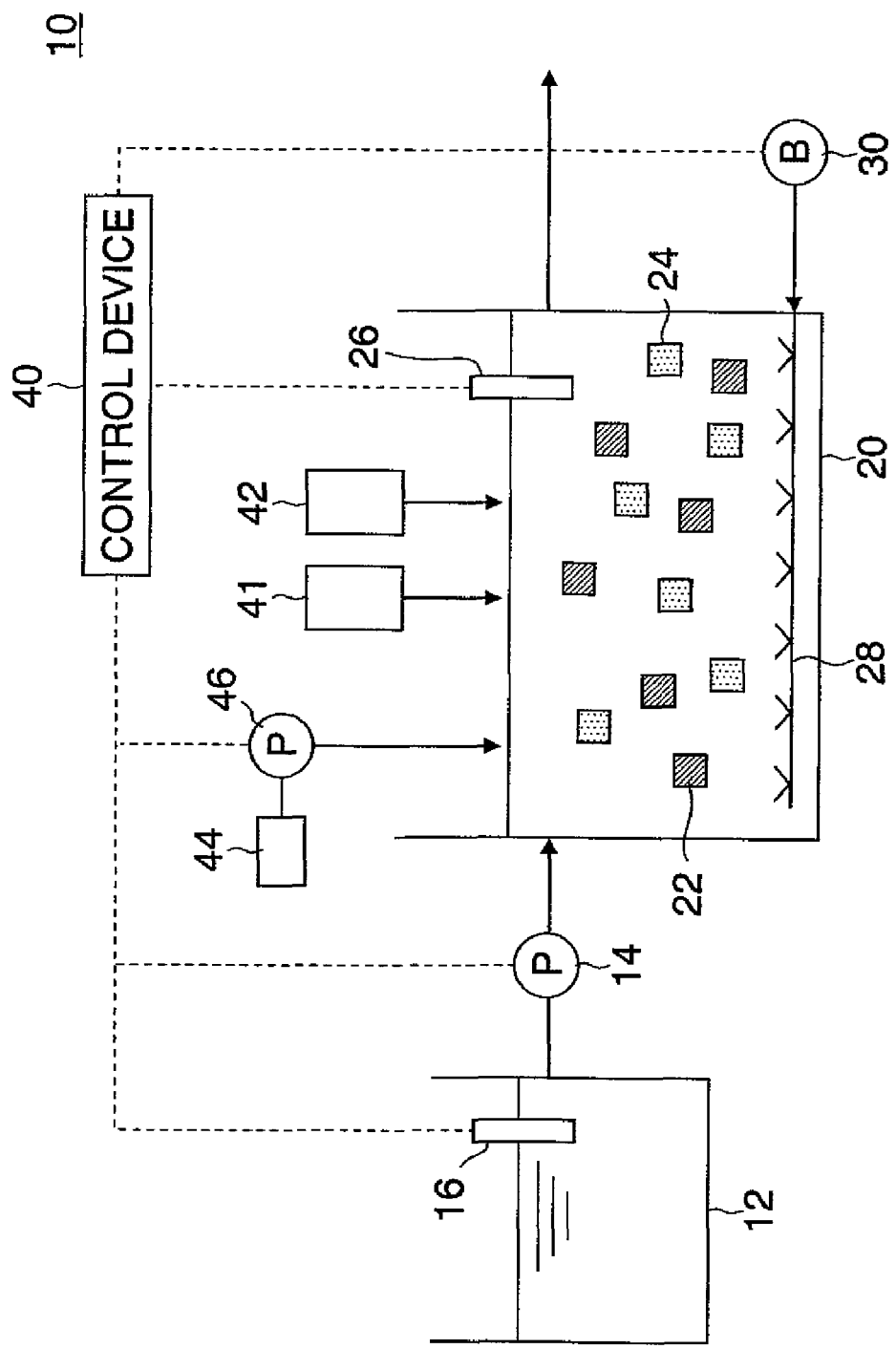
FIG. 1 is a block diagram illustrating one example of a wastewater treatment apparatus.

FIG. 1 is a block diagram illustrating one example of a wastewater treatment apparatus for conducting a wastewater treatment method according to the present embodiment. As is illustrated in FIG. 1, a wastewater treatment apparatus 10 includes: a source water tank 12 in which wastewater to be treated (source wastewater) is stored; a treatment tank 20 in which the wastewater brought from the source water tank 12 is treated; a nitrification carrier supply section 41 which supplies an unacclimated nitrification carrier 22 to the treatment tank 20; a denitrification carrier supply section 42 which supplies an unacclimated denitrification carrier 24 to the treatment tank 20; a tank 44 in which a nitrite solution is stored; a pump 46 which supplies the nitrite solution to the treatment tank 20 from the tank 44; and a control device 40 which controls each section in the wastewater treatment apparatus 10.

The wastewater which is stored in the source water tank 12 is wastewater containing at least ammonium nitrogen, and may contain nutrient salts of nitrogen, phosphorus, carbon and the like, in addition to the ammonium nitrogen. The source water tank 12 is connected to the treatment tank 20. Thus, the wastewater can be supplied to the treatment tank 20 from the source water tank 12 by the pump 14.

The nitrification carrier supply section 41 and the denitrification carrier supply section 42 are capable of storing an unacclimated nitrification carrier 22 and an unacclimated denitrification carrier 24 respectively, and charging the unacclimated nitrification carrier 22 and the unacclimated denitrification carrier 24 into the treatment tank 20, respectively. A hopper can be employed as the nitrification carrier supply section 41 and the denitrification carrier supply section 42, for instance.

The unacclimated nitrification carrier 22 and the unacclimated denitrification carrier 24 which have been charged into the treatment tank 20 from the nitrification carrier supply section 41 and the denitrification carrier supply section 42 respectively are acclimated in the treatment tank 20. Thereby, the nitrifying bacteria are accumulated in the nitrification carrier 22 dominantly, and the anaerobic ammonium-oxidizing bacteria are accumulated in the denitrification carrier 24 dominantly. The acclimation of the nitrification carrier 22 and the denitrification carrier 24 will be described later in detail.

It has been conventionally thought necessary to use a biofilm in which the nitrifying bacteria and the anaerobic ammonium-oxidizing bacteria coexist, when allowing a nitrification reaction and a denitrification reaction to proceed in the identical treatment tank. In such circumstances, the inventors of the presently disclosed subject matter have made an extensive investigation, and as a result, found that by immobilizing the nitrifying bacteria and the anaerobic ammonium-oxidizing bacteria in each separate carrier, the nitrification reaction and the denitrification reaction can be allowed to proceed in the treatment tank in which these two kinds of carriers are mixed in the tank. The wastewater treatment apparatus 10 according to the present embodiment is based on the above described knowledge, and the nitrification carrier 22 having the nitrifying bacteria (ammonium oxidation bacterium) accumulated therein dominantly and the denitrification carrier 24 having the anaerobic ammonium-oxidizing bacteria accumulated therein dominantly are mixed in the treatment tank 20. In other words, the nitrifying bacteria and the anaerobic ammonium-oxidizing bacteria are immobilized in each different carrier from the other (nitrification carrier 22 and denitrification carrier 24).

As described above, since the nitrifying bacteria and the anaerobic ammonium-oxidizing bacteria are immobilized in each independent carrier, the ratio of bacterial loads of the nitrifying bacteria to the anaerobic ammonium-oxidizing bacteria can be easily controlled by adjusting the volume ratio (ratio of the charging amounts) of the nitrification carrier 22 to the denitrification carrier 24. Accordingly, the method prevents any one of the nitrification reaction and the denitrification reaction from becoming a rate-limiting factor, and can rapidly perform the wastewater treatment.

In addition, in the case of a double-structure carrier (carrier described in Japanese National Publication of International Patent Application No. 2001-506535 and Japanese Patent Application Laid-Open No. 2004-230225, for instance) which makes any one of the nitrifying bacteria and the anaerobic ammonium-oxidizing bacteria entrapped and immobilized in its inner part and has the other bacteria attached on the surface of the carrier, a diffusion of a raw material into the inner layer of the carrier becomes a rate-limiting factor and a sufficient rate of wastewater treatment is not occasionally obtained. This is because when the double-structure carrier has a thick outer layer, the raw material for the reaction cannot rapidly diffuse into the inner layer, so the supply (diffusion) of the raw material for the reaction to the bacteria which inhabit in the inner layer limits the rate. In contrast to this, when the nitrifying bacteria and the anaerobic ammonium-oxidizing bacteria are immobilized in each separate carrier (nitrification carrier 22 and denitrification carrier 24) as in the present embodiment, the decrease of the rate of the wastewater treatment caused by the diffusion limitation of the raw material for the reaction does not occur.

In addition, in the case of the double-structure carrier, the outer layer of the carrier may exfoliate, and the bacteria which inhabit in the outer layer may flow out from the treatment tank. Then, the balance between bacterial loads of the nitrifying bacteria and the anaerobic ammonium-oxidizing bacteria may be lost, which occasionally results in causing unstable wastewater treatment. In contrast to this, when the nitrifying bacteria and the anaerobic ammonium-oxidizing bacteria are immobilized in each separate carrier (nitrification carrier 22 and denitrification carrier 24) as in the present embodiment, the balance between the bacterial loads of the nitrifying bacteria and the anaerobic ammonium-oxidizing bacteria can be stably maintained.

The nitrifying bacteria accumulated in the nitrification carrier 22 and the anaerobic ammonium-oxidizing bacteria accumulated in the denitrification carrier 24 coexist in the treatment tank 20. Thereby, both of the nitrification reaction with use of the nitrification carrier 22 and the denitrification reaction with use of the denitrification carrier 24 are allowed to proceed in the treatment tank 20, and can decompose ammonium nitrogen in wastewater to nitrogen gas. Here, the nitrification reaction means a reaction which nitrites the ammonium nitrogen in the wastewater into nitrite with the use of the nitrifying bacteria. And, the denitrification reaction means a reaction which denitrifies the nitrite formed through the nitrification reaction with the anaerobic ammonium-oxidizing bacteria, while using the ammonium nitrogen in the wastewater as a hydrogen donor.

The nitrification carrier 22 is not limited in particular as long as the nitrifying bacteria are immobilized in the nitrification carrier 22. The nitrification carrier 22 may be an immobilization pellet or a contact filter medium. An entrapping immobilization pellet which has the nitrifying bacteria entrapped and immobilized in its inner part is preferably used as the immobilization pellet type of the nitrification carrier 22. The entrapping immobilization pellet can reliably control the bacterial load, because an exfoliation of the biofilm does not occur, which can occur in the case of the attachment immobilization pellet. In addition, when the entrapment immobilization pellet is used, the return of sludge is unnecessary in the acclimation step, so the nitrifying bacteria can be comparatively easily acclimated.

The immobilizing material of the nitrification carrier 22 is not limited in particular. As the immobilizing material, gels of polyvinyl alcohol, alginic acid, polyethylene glycol and the like, and plastics such as cellulosic plastic, polyester, polypropylene and polyvinyl chloride may be employed, for instance. The shape of the nitrification carrier 22 may be, for instance, a spherical shape, a cylindrical shape, a cubic shape or a rectangular shape. The structure of the nitrification carrier 22 may be a porous structure, a honeycomb structure, a sponge-like structure, a fibrous structure or a chrysanthemum-like structure. Alternatively, a granule carrier with the use of the self-granulation of a microorganism may be used as the nitrification carrier 22. Contact filter media which can be used for the nitrification carrier 22 can include those made from polyvinyl chloride and polyethylene. The diameter (width) of the nitrification carrier 22 is preferably 1 mm or more and 10 mm or less from the viewpoint of preventing the blockade in the wastewater treatment apparatus. In addition, the filling factor of the nitrification carrier 22 (ratio of volume of the nitrification carrier 22 with respect to volume of the wastewater in the treatment tank 20) is preferably 5 vol % or more and 50 vol % or less.

The denitrification carrier 24 is not limited in particular as long as the anaerobic ammonium-oxidizing bacteria are immobilized in the denitrification carrier 24, and may be an immobilization pellet or a contact filter medium. The immobilization pellet to be used for the denitrification carrier 24 may be an entrapping immobilization pellet which has the anaerobic ammonium-oxidizing bacteria entrapped and immobilized in its inner part, or an attachment depositing immobilization pellet which has the anaerobic ammonium-oxidizing bacteria attached and immobilized on its surface. Among them, the entrapment immobilization pellet is preferably used as the denitrification carrier 24. The entrapment immobilization pellet can reliably control the bacterial load because an exfoliation of the biofilm does not occur, which can occur in the case of the attachment immobilization pellet. The entrapping immobilization pellet can reliably hold bacteria in the treatment tank, and accordingly is suitable for a carrier for immobilizing anaerobic ammonium-oxidizing bacteria therein which are precious since the bacteria are obtained by incubation. Furthermore, when the entrapping immobilization pellet is used, the return of sludge is unnecessary in the acclimation step, so the bacteria can be comparatively easily acclimated.

The immobilizing material of the denitrification carrier 24 is not limited in particular. As the immobilizing material, gels of polyvinyl alcohol, alginic acid, polyethylene glycol and the like, and plastics such as cellulosic plastic, polyester, polypropylene and polyvinyl chloride may be employed, for instance. The shape of the denitrification carrier 24 may be, for instance, a spherical shape, a cylindrical shape, a cubic shape or a rectangular shape. The structure of the nitrification carrier 22 may be a porous structure, a honeycomb structure, a sponge-like structure, a fibrous structure or a chrysanthemum-like structure. Alternatively, a granule carrier with the use of the self-granulation of a microorganism may be used as the denitrification carrier 24. Contacting filter media which can be used for the denitrification carrier 24 can include those made from polyvinyl chloride and polyethylene. The diameter (width) of the denitrification carrier 24 is preferably 1 mm or more and 10 mm or less from the viewpoint of preventing the blockade in the wastewater treatment apparatus. In addition, the filling factor of the denitrification carrier 24 (ratio of volume of the denitrification carrier 24 with respect to volume of wastewater in the treatment tank 20) is preferably 5 vol % or more and 50 vol % or less.

As is illustrated in FIG. 1, the source water tank 12 and the treatment tank 20 are each provided with a sensor 16 and a sensor 26 which measure the quality of the wastewater. The sensor 16 and the sensor 26 are configured to be capable of measuring, for instance, the concentrations of ammonium, nitrite and nitrate, the quantity of dissolved oxygen, and pH (concentration of hydrogen ions). The results measured by the sensor 16 and the sensor 26 are sent to the control device 40, and the control device 40 controls each section in the wastewater treatment apparatus 10 on the basis of these measurement results.

The treatment tank 20 is provided with an air-diffusing device 28, and is configured so that air is supplied from a blower 30 through the air-diffusing device 28. Thereby, the wastewater in the treatment tank 20 is made to be exposed to air and is stirred, and simultaneously dissolved oxygen is supplied into the wastewater.

The control device 40 may preferably control the blower 30 so that the amount of the dissolved oxygen in the wastewater in the treatment tank 20 is maintained in a prescribed range of 1.0 mg/L or more and 8.0 mg/L or less (more preferably 2.0 mg/L or more and 4.0 mg/L or less). When the amount of the dissolved oxygen is excessively high, the activity of the anaerobic ammonium-oxidizing bacteria decreases which are anaerobic bacteria. On the other hand, when the amount of the dissolved oxygen is excessively low, the activity of the nitrifying bacteria decreases which are aerobic bacteria. By maintaining the amount of the dissolved oxygen of the wastewater in the treatment tank 20 in the above described range, the activities of the nitrifying bacteria and the anaerobic ammonium-oxidizing bacteria can be maintained, and the wastewater treatment can be rapidly performed.

The concentration of nitrite nitrogen in the treatment tank 20 is preferably maintained at 300 mgN/L or less in order to prevent the excessive amount of nitrite from giving influence to the nitrification reaction and the denitrification reaction. The concentration of ammonium nitrogen in the treatment tank 20 is preferably maintained in the range of 1 to 300 mgN/L according to the concentration of the nitrite nitrogen.

The nitrite concentration and the ammonium concentration in the treatment tank 20 can be adjusted by allowing the control device 40 to control the pump 14 so as to change the retention time (hydrological retention time) of the wastewater in the treatment tank 20.

Next, the acclimation of a nitrification carrier 22 and a denitrification carrier 24 will be described below.

Firstly, the denitrification carrier supply section 42 charges unacclimated denitrification carriers 24 into the treatment tank 20. Here, the unacclimated denitrification carrier 24 is a carrier containing anaerobic ammonium-oxidizing bacteria, and is a carrier in which the number of the contained anaerobic ammonium-oxidizing bacteria is $1.5 \times 10^7$ cells/mL or less when being measured by a direct counting operation in a FISH (Fluorescence In Situ Hybridization) method (equivalent to $2.0 \times 10^8$ copies/g in the real-time PCR (polymerase chain reaction) method). The number of the anaerobic ammonium-oxidizing bacteria of "$1.5 \times 10^7$ cells/mL" corresponds to approximately 2.5 kg-N/m$^3$-carrier/day by a nitrogen-removing rate per unit volume of the denitrification carrier 24.

The direct counting operation in the FISH method is described in detail, for instance, in "K. Isaka et al., "Growth characteristic of anaerobic ammonium-oxidizing (anammox) bacteria in an anaerobic biological filtrated (ABF) reactor,"

Applied Microbiology and Biotechnology, 70, 47-52 (2006)", so the description will be omitted.

Furthermore, the real-time PCR method is described in detail, for instance, in "K. Isaka et A, "Ammonium removal performance of anaerobic ammonium-oxidizing bacteria immobilized in polyethylene glycol gel carrier," Applied Microbiology and Biotechnology, 76, 1457-1465 (2007)", so the description will be omitted here.

Next, the anaerobic ammonium-oxidizing bacteria are acclimated in the unacclimated denitrification carrier 24 which has been charged into the treatment tank 20 under an anaerobic condition. Specifically, when acclimating the anaerobic ammonium-oxidizing bacteria, it is preferable to appropriately supply nitrite (nitrite solution) necessary for the acclimation of the anaerobic ammonium-oxidizing bacteria to the treatment tank 20 from the tank 44 while maintaining the amount of dissolved oxygen (DO) in the wastewater in the treatment tank 20 at less than 1 mg/L (more preferably at 0.2 mg/L or less).

In addition, not only nitrite but also ammonium is necessary for acclimating the anaerobic ammonium-oxidizing bacteria. Since the ammonium is contained in the source wastewater, the ammonium contained in the source wastewater can be used for the acclimation. For instance, the source wastewater containing 50 to 2,000 mgN/L (preferably 100 to 1,000 mgN/L) of ammonium nitrogen may be used for the acclimation as in the state. Alternatively, when the ammonium concentration in the source wastewater is low, the deficient ammonium can be also appropriately supplied to the treatment tank 20.

A nitrite solution to be supplied to the treatment tank 20 is not limited in particular as long as the nitrite solution is a liquid containing a nitrite component, and may be an aqueous solution containing a nitrite salt or wastewater containing the nitrite, for instance. The amount of the nitrite solution to be added to the treatment tank 20 is preferably determined according to a progressing state of the acclimation for the denitrification carrier 24. The amount of the nitrite solution to be added to the treatment tank 20 can be determined, for instance, on the basis of ammonium concentrations, nitrite concentrations and nitrate concentrations in the source water tank 12 and the treatment tank 20, which are measured by the sensor 16 and the sensor 26 respectively. At the initial stage of the acclimation step for the denitrification carrier 24, it is preferable to adjust the amount of the nitrite solution to be added so that the concentration of nitrite nitrogen in the treatment tank 20 is 100 mgN/L or less.

When acclimating the denitrification carrier 24, it is preferable to intermittently aerate and stir the wastewater in the treatment tank 20 with the air-diffusing device 28 while operating the blower 30. It is particularly preferable to aerate and stir the wastewater by setting a time period of operating aeration per one time at 1 to 30 minutes, and by operating the blower 30 once or more times a day. At this time, it is preferable to adjust the frequency of the aeration and stirring so that the amount of dissolved oxygen (DO) in the wastewater in the treatment tank 20 is less than 1 mg/L (more preferably 0.2 mg/L or less). By intermittently aerating and stirring the wastewater in the treatment tank 20, the treatment method makes the denitrification carrier in the treatment tank flow, prevents a liquid around the denitrification carrier (wastewater) from stagnating, and can efficiently acclimate the anaerobic ammonium-oxidizing bacteria.

It is preferable to acclimate the denitrification carrier 24 so that the number of the anaerobic ammonium-oxidizing bacteria is $1.5 \times 10^7$ cells/mL or more (more preferably $4.5 \times 10^7$ cells/mL or more) when the number is measured with a direct counting operation in the FISH method. Thereby, the method can more reliably prevent anaerobic ammonium-oxidizing bacteria in the denitrification carrier 24 from being deactivated when the nitrification carrier 22 is acclimated under an aerobic condition.

Here, the number of the anaerobic ammonium-oxidizing bacteria of "$4.5 \times 10^7$ cells/mL" corresponds to $4.5 \times 10^8$ copies/g by the real-time PCR method, and approximately 5 kg-N/m$^3$-carrier/day by a nitrogen-removing rate per unit volume of the denitrification carrier 24.

The progressing state of the acclimation of the denitrification carrier 24 (start up of denitrification reaction) can be confirmed from the decreasing tendency of the ammonium concentration and the nitrite concentration in the treatment tank 20 and the increasing tendency of the nitrate concentration in the treatment tank 20. Particularly, if the relationship of (amount of consumed ammonium):(amount of consumed nitrite):(amount of formed nitrate)=1:1.32:0.26 is approximately satisfied according to the stoichiometric ratio in the above described reaction formula (I), it is assumed that the acclimation of the denitrification carrier 24 (start up of denitrification reaction) is appropriately progressing. Alternatively, the progressing state of the acclimation of the denitrification carrier 24 (start up of denitrification reaction) may be confirmed from the increasing tendency of pH in the treatment tank 20 based on the fact that approximately 0.13 mol of hydrogen ions are consumed with respect to 1 mol of ammonium in the reaction.

After the denitrification carrier 24 has been acclimated, an unacclimated nitrification carrier 22 is charged into the treatment tank 20 from the nitrification carrier supply section 41. Here, the unacclimated nitrification carrier 22 means a carrier which contains nitrifying bacteria (nitrite-type nitrifying bacteria) having a copy number of $6.0 \times 10^7$ copies/mL or less as measured by the real-time PCR method. In the above description, the copy number of the nitrifying bacteria of "$6.0 \times 10^7$ copies/mL" corresponds to approximately 0.25 kg-N/m$^3$-carrier/day by the rate of treating ammonium nitrogen per unit volume of the nitrification carrier 22.

Next, the unacclimated nitrification carrier 22 which has been charged into the treatment tank 20 is acclimated therein under an aerobic condition. Specifically, it is preferable to stop supplying the nitrite solution from the tank 44, and also to operate the blower 30 to aerate and stir the wastewater in the treatment tank 20 and maintain the amount of dissolved oxygen (DO) in the wastewater in the treatment tank 20 at 1 to 8 mg/L (more preferably 2 to 3 mg/L). The operation of stopping supplying the nitrite solution from the tank 44 can prevent the excessive amount of nitrite from existing in the treatment tank 20, and the nitrifying bacteria and the anaerobic ammonium-oxidizing bacteria from being affected by the excessive amount of nitrite.

The acclimation operation for the denitrification carrier 24 may be gradually switched to the acclimation operation for the nitrification carrier 22. For instance, after the acclimation of the denitrification carrier 24 has been completed, the amount of dissolved oxygen in the treatment tank 20 may be gradually raised from a slightly aerobic state of 1 mg/L, while the amount of the nitrite solution added from the tank 44 is gradually decreased. At this time, it is preferable to gradually decrease the amount of the nitrite solution to be added according to the proliferating state of the nitrifying bacteria.

It is preferable to acclimate the nitrification carrier 22 so that the copy number of the nitrifying bacteria is $1.2 \times 10^8$ copies/mL or more (more preferably $6.0 \times 10^8$ copies/mL or more) in the real-time PCR method. Here, the copy number of the nitrifying bacteria of "$1.2 \times 10^8$ copies/mL" corresponds to 0.5 kg-N/m³-carrier/day by the rate of treating ammonium nitrogen per unit volume of the nitrification carrier 22. In addition, the copy number of the nitrifying bacteria of "6.0× 10⁸ copies/mL" corresponds to 2.5 kg-N/m³-carrier/day by the rate of treating ammonium nitrogen per unit volume of the nitrification carrier 22.

The progressing state of the acclimation of the nitrification carrier 22 (start up of nitrite-type nitrification reaction) can be confirmed from the decreasing tendency of the ammonium concentration in the treatment tank 20 and the increasing tendency of the nitrite concentration in the treatment tank 20. Alternatively, the progressing state of the acclimation of the nitrification carrier 22 (start up of nitrite-type nitrification reaction) may be confirmed from the decreasing tendency of pH in the treatment tank 20 based on the fact that hydrogen ions are formed in the nitrite-type nitrification reaction.

As was described above, the acclimation method according to the presently disclosed subject matter can acclimate the nitrification carrier 22 without deactivating the anaerobic ammonium-oxidizing bacteria in the denitrification carrier 24, by acclimating the nitrification carrier 22 under an aerobic condition after having acclimated the denitrification carrier 24 under an anaerobic condition. This is because the acclimated anaerobic ammonium-oxidizing bacteria generates a local anaerobic field in their surroundings by generating a large quantity of nitrogen gas by the denitrification reaction, and the activity of the acclimated anaerobic ammonium-oxidizing bacteria can be maintained even if the condition in the treatment tank is aerobic as a whole.

Furthermore, the above described acclimation method can simplify the acclimation step and reduce its cost, because of acclimating the nitrifying bacteria and the anaerobic ammonium-oxidizing bacteria in the identical tank (treatment tank 20).

The wastewater treatment method according to one embodiment of the presently disclosed subject matter was described in the above, but the presently disclosed subject matter is not limited thereto, and of course, can be improved or modified in various ways within a range that does not deviate from the gist of the presently disclosed subject matter.

The above described embodiment includes the steps of acclimating the denitrification carrier 24 and then charging an unacclimated nitrification carrier 22 into the treatment tank 20, but the unacclimated nitrification carrier 22 may be charged into the treatment tank 20 beforehand, for instance, in the step of acclimating the denitrification carrier 24 or before the step of acclimating the denitrification carrier 24.

In addition, the above described embodiment includes a method of aerating and stirring the wastewater in the treatment tank 20 with the air-diffusing device 28, but the wastewater in the treatment tank 20 may be stirred by forming and using a swirling flow in the treatment tank 20.

Figure 2:
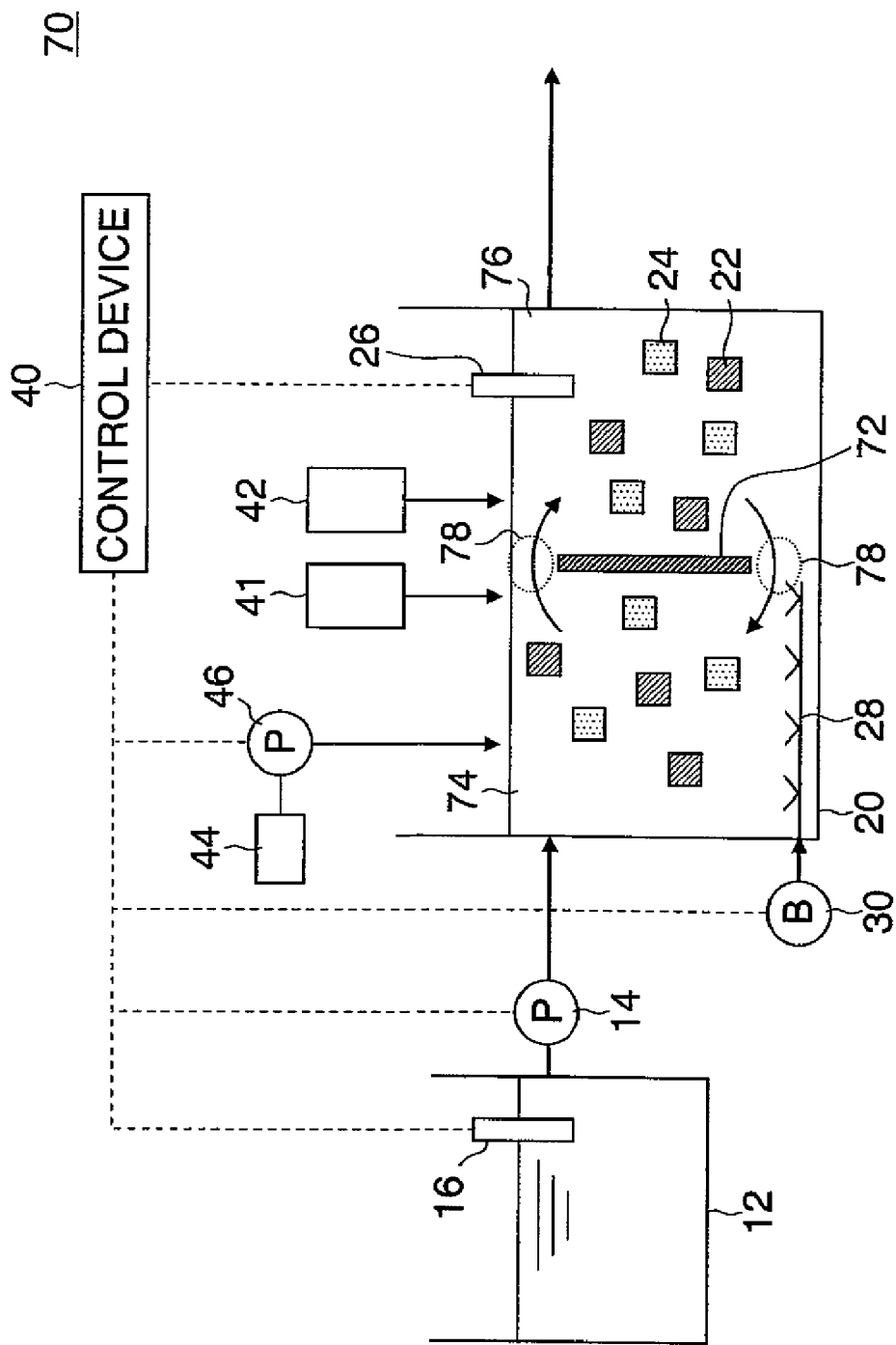
FIG. 2 is a block diagram illustrating one example of the wastewater treatment apparatus which stirs wastewater in a treatment tank by using a swirling flow.

FIG. 2 is a block diagram illustrating one example of the wastewater treatment apparatus which stirs wastewater in a treatment tank 20 by using the swirling flow. In FIG. 2, the same reference numerals will be put on common components to the wastewater treatment apparatus 10 illustrated in FIG. 1, and the description will be omitted here.

As is illustrated in FIG. 2, the wastewater treatment apparatus 70 is different from the wastewater treatment apparatus 10 in a point that the wastewater treatment apparatus 70 includes a baffle plate 72 which divides the treatment tank 20 into a first treatment chamber 74 and a second treatment chamber 76.

The baffle plate 72 is arranged so as to form communicating paths 78 which communicate the first treatment chamber 74 to the second treatment chamber 76 in the upper part and the bottom part of the treatment tank 20. The planar shape of the communicating path 78 may not be limited in particular, and may be a polygon such as a square and a rectangle, a circle or an ellipse. The communicating paths 78 may be each provided on the upper part and the bottom part of the treatment tank 20, or a plurality of communicating paths 78 may be provided on the upper part and the bottom part of the treatment tank 20.

An air-diffusing device 28 is provided in any one of the first treatment chamber 74 and the second treatment chamber 76, and the swirling flow (represented by arrows in FIG. 2) of the wastewater can be formed in the treatment tank 20 through the communicating path 78 by operating the air-diffusing device 28.

Thereby, only by providing the air-diffusing device 28 in any one of the first treatment chamber 74 and the second treatment chamber 76, the treatment apparatus 70 can supply dissolved oxygen into the wastewater of the treatment tank 20 while using a swirling flow of the wastewater formed in the treatment tank 20, and make the carriers (nitrification carrier 22 and denitrification carrier 24) in the treatment tank 20 flow. Accordingly, energy necessary for the wastewater treatment operation can be reduced.

The wastewater treatment apparatus 70 having the above described structure can effectively make the denitrification carrier 24 flow by using a swirling flow of the wastewater in the treatment tank 20, when intermittently conducting aeration and stirring in acclimating the denitrification carrier 24, while inhibiting the increase of the amount of the dissolved oxygen (DO) in the treatment tank 20.

FIG. 2 illustrates an example of forming the swirling flow of the wastewater in the treatment tank 20 with a flat baffle plate 72, but the shape of the baffle plate 72 is not limited to the example, and may have various shapes. For instance, as is illustrated in FIG. 3, a cylindrical baffle plate 72 may be arranged in the treatment tank 20 so as to form communicating paths 78, and an air-diffusing device 28 may be provided in any one of the first treatment chamber 74 and the second treatment chamber 76 (in the example of FIG. 3, first treatment chamber 74). Then, the swirling flow of the wastewater in the treatment tank 20 is formed by the air-diffusing device 28 through the communicating paths 78.

What is claimed is:

1. A wastewater treatment method for treating wastewater containing ammonium nitrogen, comprising the steps of:
  charging an unacclimated denitrification carrier containing anaerobic ammonium-oxidizing bacteria into a treatment tank;
  charging an unacclimated nitrification carrier containing nitrifying bacteria into the treatment tank;
  acclimating the unacclimated denitrification carrier in the treatment tank under an anaerobic condition;
  acclimating the unacclimated nitrification carrier in the treatment tank under an aerobic condition, after having acclimated the denitrification carrier;
  nitriting the ammonium nitrogen in the wastewater to generate nitrite with the acclimated nitrification carrier; and
  denitrifying the nitrite generated by nitriting the ammonium nitrogen with the acclimated denitrification carrier, while using the ammonium nitrogen in the wastewater as a hydrogen donor.

2. The wastewater treatment method according to claim 1, wherein the denitrification carrier is acclimated so that the number of the anaerobic ammonium-oxidizing bacteria is $1.5 \times 10^7$ cells/mL or more, and then the nitrification carrier is acclimated.

3. The wastewater treatment method according to claim 2, wherein the nitrification carrier is acclimated so that the number of the nitrifying bacteria is $6.0\times10^7$ cells/mL or more.

4. The wastewater treatment method according to claim 2, wherein the nitrification carrier is acclimated so that the number of the nitrifying bacteria is $1.2\times10^8$ cells/mL or more.

5. The wastewater treatment method according to claim 1, wherein the concentration of dissolved oxygen in the treatment tank is maintained at less than 1 mg/L in the step of acclimating the denitrification carrier.

6. The wastewater treatment method according to claim 1, wherein the concentration of dissolved oxygen in the treatment tank is maintained at 1 mg/L or more and 8 mg/L or less, in the step of acclimating the nitrification carrier.

7. The wastewater treatment method according to claim 1, wherein a nitrite solution is supplied to the treatment tank in the step of acclimating the denitrification carrier.

8. The wastewater treatment method according to claim 7, wherein the wastewater in the treatment tank is aerated and stirred intermittently with the use of an air diffuser, in the step of acclimating the denitrification carrier.

9. The wastewater treatment method according to claim 1, wherein the wastewater in the treatment tank is aerated and stirred intermittently with the use of an air diffuser, in the step of acclimating the denitrification carrier.

10. The wastewater treatment method according to claim 1, wherein the denitrification carrier and the nitrification carrier are entrapment immobilization pellets.

11. The wastewater treatment method according to claim 1, wherein the nitrification carrier is acclimated so that the number of the nitrifying bacteria is $6.0\times10^7$ cells/mL or more.

12. The wastewater treatment method according to claim 1, wherein the nitrification carrier is acclimated so that the number of the nitrifying bacteria is $1.2\times10^8$ cells/mL or more.

* * * * *